(12) United States Patent
Andreasson et al.

(10) Patent No.: US 10,300,759 B2
(45) Date of Patent: May 28, 2019

(54) METHOD FOR DETERMINING WHETHER OR NOT GROUND CONTACT LOSS IS IMMINENT FOR A WHEEL OF A VEHICLE

(71) Applicant: VOLVO CONSTRUCTION EQUIPMENT AB, Eskilstuna (SE)

(72) Inventors: Stefan Andreasson, Tolg (SE); Håkan Johansson, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 146 days.

(21) Appl. No.: 15/319,407

(22) PCT Filed: Jun. 18, 2014

(86) PCT No.: PCT/SE2014/000085
§ 371 (c)(1),
(2) Date: Dec. 16, 2016

(87) PCT Pub. No.: WO2015/195002
PCT Pub. Date: Dec. 23, 2015

(65) Prior Publication Data
US 2017/0129299 A1    May 11, 2017

(51) Int. Cl.
*B60G 5/02*    (2006.01)
*B60G 17/018*    (2006.01)
(Continued)

(52) U.S. Cl.
CPC ........... *B60G 17/0182* (2013.01); *B60G 5/02* (2013.01); *B60G 5/04* (2013.01); *B60G 17/0165* (2013.01);
(Continued)

(58) Field of Classification Search
None
See application file for complete search history.

(56) References Cited

U.S. PATENT DOCUMENTS 5,276,622 A    1/1994    Miller et al.
6,049,746 A    4/2000    Southward et al.
(Continued)

FOREIGN PATENT DOCUMENTS

| WO | 2006093438 A1 | 9/2006 | |
| WO | 2007096646 A1 | 8/2007 | |
| WO | WO-2007096646 A1 * | 8/2007 | ......... B60G 17/0195 |

OTHER PUBLICATIONS

International Search Report (dated Mar. 31, 2015) for corresponding International App. PCT/SE2014/000085.
(Continued)

*Primary Examiner* — Jonathan M Dager
*Assistant Examiner* — Garrett F Evans
(74) *Attorney, Agent, or Firm* — WRB-IP LLP

(57) ABSTRACT

A method is provided for determining whether or not ground contact loss is imminent for a wheel of a vehicle, the vehicle including a vehicle body having a vertical extension in a vertical direction, the wheel being allowed to be subjected to a relative vertical displacement, in the vertical direction, in relation to the vehicle body, the vehicle further being such that a maximum value of a vertical displacement of the wheel relative to the vehicle body is limited to a relative vertical displacement limit, the method including determining an actual relative vertical displacement of the wheel relative to the vehicle body, determining a limit margin as the difference between the actual relative vertical displacement and the relative vertical position limit, and determining that ground contact loss is imminent for a wheel if the limit margin is within a predetermined vertical threshold range.

21 Claims, 6 Drawing Sheets

(51) Int. Cl.
  *B60W 40/10*      (2012.01)
  *B60K 28/16*      (2006.01)
  *B60W 30/18*      (2012.01)
  *B60G 5/04*       (2006.01)
  *B60G 17/0165*    (2006.01)
  *B60G 21/067*     (2006.01)

(52) U.S. Cl.
  CPC .......... *B60G 21/067* (2013.01); *B60K 28/165* (2013.01); *B60W 30/18172* (2013.01); *B60W 40/10* (2013.01); *B60G 2200/318* (2013.01); *B60G 2204/17* (2013.01); *B60G 2204/45* (2013.01); *B60G 2206/0112* (2013.01); *B60G 2400/252* (2013.01); *B60G 2400/822* (2013.01); *B60G 2400/90* (2013.01); *B60G 2500/30* (2013.01); *B60G 2800/182* (2013.01); *B60G 2800/21* (2013.01); *B60G 2800/95* (2013.01); *B60W 2720/30* (2013.01)

(56) References Cited

U.S. PATENT DOCUMENTS

| | | |
|---|---|---|
| 2004/0026880 A1 | 2/2004 | Bundy et al. |
| 2010/0045092 A1* | 2/2010 | Hjerth ................ B60P 1/045 298/17 S |
| 2012/0131122 A1 | 5/2012 | Gross |
| 2012/0285761 A1* | 11/2012 | Lee ................ B60G 17/019 180/209 |
| 2014/0001717 A1 | 1/2014 | Giovanardi et al. |
| 2014/0005888 A1 | 1/2014 | Bose et al. |

OTHER PUBLICATIONS

International Preliminary Report on Patentability (dated Sep. 16, 2016) for corresponding International App. PCT/SE2014/000085.
Supplementary European Search Report (dated Feb. 16, 20118) for corresponding European App. EP 14 89 5035.

* cited by examiner

METHOD FOR DETERMINING WHETHER OR NOT GROUND CONTACT LOSS IS IMMINENT FOR A WHEEL OF A VEHICLE

BACKGROUND AND SUMMARY

The present disclosure relates to a method for determining whether or not ground contact loss is imminent for a wheel of a vehicle. Moreover, the present disclosure relates to a computer program, a computer readable medium, a control unit for a vehicle and/or a vehicle.

The present disclosure can be applied in heavy-duty vehicles, such as trucks, buses and construction equipment. Although the invention will be described with respect to an articulated hauler, the invention is not restricted to this particular vehicle, but may also be used in other vehicles, for instance other types of work machines such as a wheel loader, a dumper truck, or any other type of construction equipment.

A vehicle, for instance a work machine, generally comprises a plurality of wheels that are adapted to propel and/or brake the vehicle. In order to ensure that the operation of the vehicle is conducted in a desired manner, it may be desired to have information as regards the condition of one or more of the plurality of wheels.

For instance, it may be desired to receive information as regards whether or not ground contact loss is imminent for one or tore wheels of the vehicle. In the event that it is determined that ground contact loss is imminent, there is for instance a risk for wheel slip and a modification of the operation of the wheels may be desired.

For instance, in the event that the several wheels are driving a vehicle and it is determined that ground contact loss is imminent for one or more of the wheels, a driving torque may be distributed from the ground contact losing wheels to the wheels that are determined to maintain ground contact. Purely by way of example, the above transfer may be executed by means of one or more differentials.

As another example, in the event that the several wheels are braking a vehicle and it is determined that ground contact loss is imminent for one or more of the wheels, a braking torque may be redistributed from the around contact losing wheels to the wheels that are determined to maintain ground contact.

US 2007/0179699 A1 discloses a method for determining whether or not wheel slip is imminent for a vehicle wheel. The method proposed in US 2007/0179699 A1 detects the lateral acceleration of the vehicle, compares the lateral acceleration thus determined with a predetermined amount of lateral acceleration, and uses the result of that comparison for determining whether or not an electronic differential should be activated.

However, it would be desired to obtain more robust method for determining whether or not ground contact loss is imminent for a wheel.

It is desirable to provide a method for determining whether or not ground contact loss is imminent for a wheel of a vehicle, which method is straightforward to use.

As such, the present disclosure relates to a method for determining whether or not ground contact loss is imminent for a wheel of a vehicle. The vehicle comprises a vehicle body having a vertical extension in a vertical direction. The wheel is allowed to be subjected to a relative vertical displacement, in the vertical direction, in relation to the vehicle body. The vehicle further is such that a maximum value of a vertical displacement of the wheel relative to the vehicle body is limited to a relative vertical displacement limit.

The method comprises:
determining an actual relative vertical displacement of the wheel relative to the vehicle body,
determining a limit margin as the difference between the actual relative vertical displacement and the relative vertical position limit and
determining that ground contact loss is in imminent for a wheel if the limit margin is within a predetermined vertical threshold range.

The above discussed method implies that it is possible to determine whether or not ground contact loss is imminent for a wheel of a vehicle without having to analyze complex data, such as estimates of the speed or slip of the wheel and/or accelerations of the vehicle. Instead, the risk that contact loss is imminent may instead be determined on the basis of measure data that are simple to estimate and determine, e.g. an actual relative vertical displacement.

Optionally, the vehicle comprises a bogie system. The bogie system comprises a plurality of wheels and the bogie system is such that each one of the wheels is allowed to be subjected to a relative vertical displacement in relation to the vehicle body. Optionally, the bogie system comprises a bogie beam connecting the wheels. The bogie beam is pivotable in relation to the vehicle body. The method may comprise determining a pivot angle of the bogie beam in relation to the vehicle body and using the pivot angle as a value indicative of the actual relative vertical displacement.

Measuring the pivot angle is a straightforward way of determining the actual relative vertical displacement of one or more wheels arranged on a bogie beam.

A second aspect of the present disclosure relates to a method for controlling the operation of a wheel of a vehicle.

The method comprises:
determining whether or not ground contact loss is imminent for the wheel using the method according to the first aspect of the present disclosure,
determining that ground contact loss is imminent and reducing the torque that is transmitted to the wheel.

A third aspect of the present disclosure relates to a computer program comprising program code means for performing the steps of any one of the methods of the first and/or second aspect of the present disclosure when the program is run on a computer.

A fourth aspect of the present disclosure relates to a computer readable medium carrying a computer program comprising program code means for performing the steps of any one of the methods of the first and/or second aspect of the present disclosure when the program product is run on a computer.

A fifth aspect of the present disclosure relates to a control unit for a vehicle. The control unit is adapted to determine whether or not ground contact loss is imminent for a wheel of the vehicle. The vehicle comprises a vehicle body having a vertical extension in a vertical direction. The wheel is allowed to be subjected to a relative vertical displacement, in the vertical direction, in relation to the vehicle body. The vehicle further is such that a maximum value of a vertical displacement of the wheel relative to the vehicle body Is limited to a relative vertical displacement limit.

The control unit is adapted to:
determine an actual relative vertical displacement of the wheel relative to the vehicle body, determine a limit margin as the difference between the actual relative vertical displacement and the relative vertical position limit and determine that ground contact loss is imminent for a wheel if the limit margin is within a predetermined vertical threshold range.

Optionally, the control unit is adapted to:
determine whether or not ground contact loss is imminent for the wheel using any one of the above discussed options,
determine that ground contact loss is imminent and
reduce the torque that is transmitted to the wheel.

A sixth aspect of the present disclosure relates to a vehicle, preferably a work machine, comprising a computer program according to the third aspect of the present disclosure and/or a computer readable medium according to the fourth aspect of the present disclosure and/or a control unit according to the fifth aspect of the present disclosure.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

The invention will be described in the following for a vehicle in the form of an articulated hauler 10 such as the one illustrated in FIG. 1. The articulated hauler 10 should be seen as an example of a vehicle which could comprise a control unit according to the present invention and/or for which the method of the present invention may be used.

The vehicle 10 comprises a vehicle body 12 having a vertical extension in a vertical direction V. Moreover, and as is indicated in FIG. 1, the vehicle body 12 also has an extension in a longitudinal dimension L in the intended drive direction of the vehicle 10.

Figure 1:
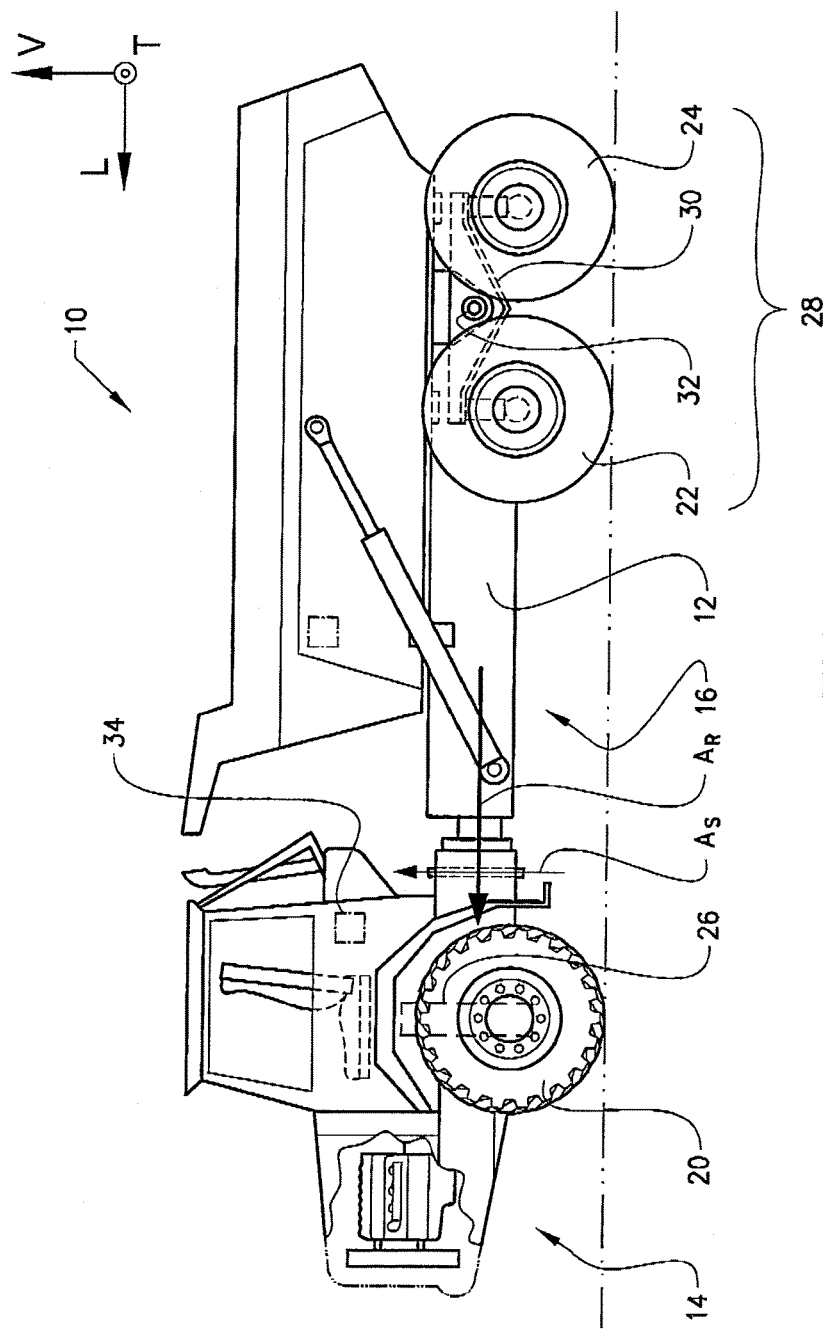
FIG. 1 is a schematic side view of a vehicle.

The FIG. 1 vehicle 10 comprises a front vehicle portion 14 and a rear vehicle portion 16. The front and rear vehicle portions 14, 6 are connected to one another such that the front and rear vehicle portions can pivot relative to one another around a steering axis As extending substantially in the vertical dimension V and/or around a geometrical axis of rotation $A_R$ extending substantially along the longitudinal dimension L. Each one of the vehicle portions 14, 16 forms part of the vehicle body 12.

Moreover, the vehicle 0 comprises a plurality of wheels 20, 22, 24 each one of which is connected, directly or indirectly, to the vehicle body 12. At least one of the wheels is allowed to be subjected to a relative vertical displacement, in the vertical direction V, in relation to the vehicle body 12. Purely by way of example, one of the wheels 20 may be connected to the vehicle body by means of an individual suspension arrangement 26. In the FIG. 1 embodiment of the vehicle 10, the individual suspension arrangement 26 is connected to the front vehicle portion 1 but in other embodiments, the rear vehicle portion 16 may instead, or also, comprise an individual suspension arrangement (not shown).

As another non-limiting example, the vehicle 10 may comprise a bogie system 28. In the FIG. 1 embodiment of the vehicle 10, the bogie system 28 is connected to the rear vehicle portion 16 but in other embodiments, the front vehicle portion 14 may instead, or also, comprise a bogie system (not shown).

As may be gleaned from FIG. 1, the bogie system 28 comprises a plurality of wheels 22, 24 and the bogie system 28 is such that each one of the wheels 22, 24 is allowed to be subjected to a relative vertical displacement in relation to the vehicle body 12. To this end, the bogie system 28 may comprise a bogie beam 30 connecting the wheels 22, 24. The bogie beam 30 is pivotable around a pivot point 32 in relation to the vehicle body 12. However, other implementations of a bogie system 28 need not comprise a beam. Purely by way of example, a bogie system may be a hydraulic bogie system (not shown).

FIG. 1 further illustrates that the vehicle 10 comprises a control unit 34. The control unit 34 may be adapted to determine whether or not ground contact loss is imminent for a wheel of the vehicle as will be described further hereinbelow.

The embodiment of the vehicle 10 illustrated in FIG. 1 is such that a maximum value of a vertical displacement of a wheel 20, 22, 24 relative to the vehicle body 2 is limited to a relative vertical displacement limit.

For an individual suspension arrangement 26, the above relative vertical displacement limit may for instance be defined by the maximum stroke of a hydraulic cylinder (not shown) of the individual suspension arrangement 26. Instead of, or in addition to, a maximum stroke of a hydraulic cylinder, an individual suspension arrangement 26 may comprise a stop (not shown) which for instance may be attached to the vehicle body 12 and adapted to abut a portion of the individual suspension arrangement 26 to thereby limit the maximum value of a vertical displacement of the wheel 20 relative to the vehicle body 12.

Figure 2:
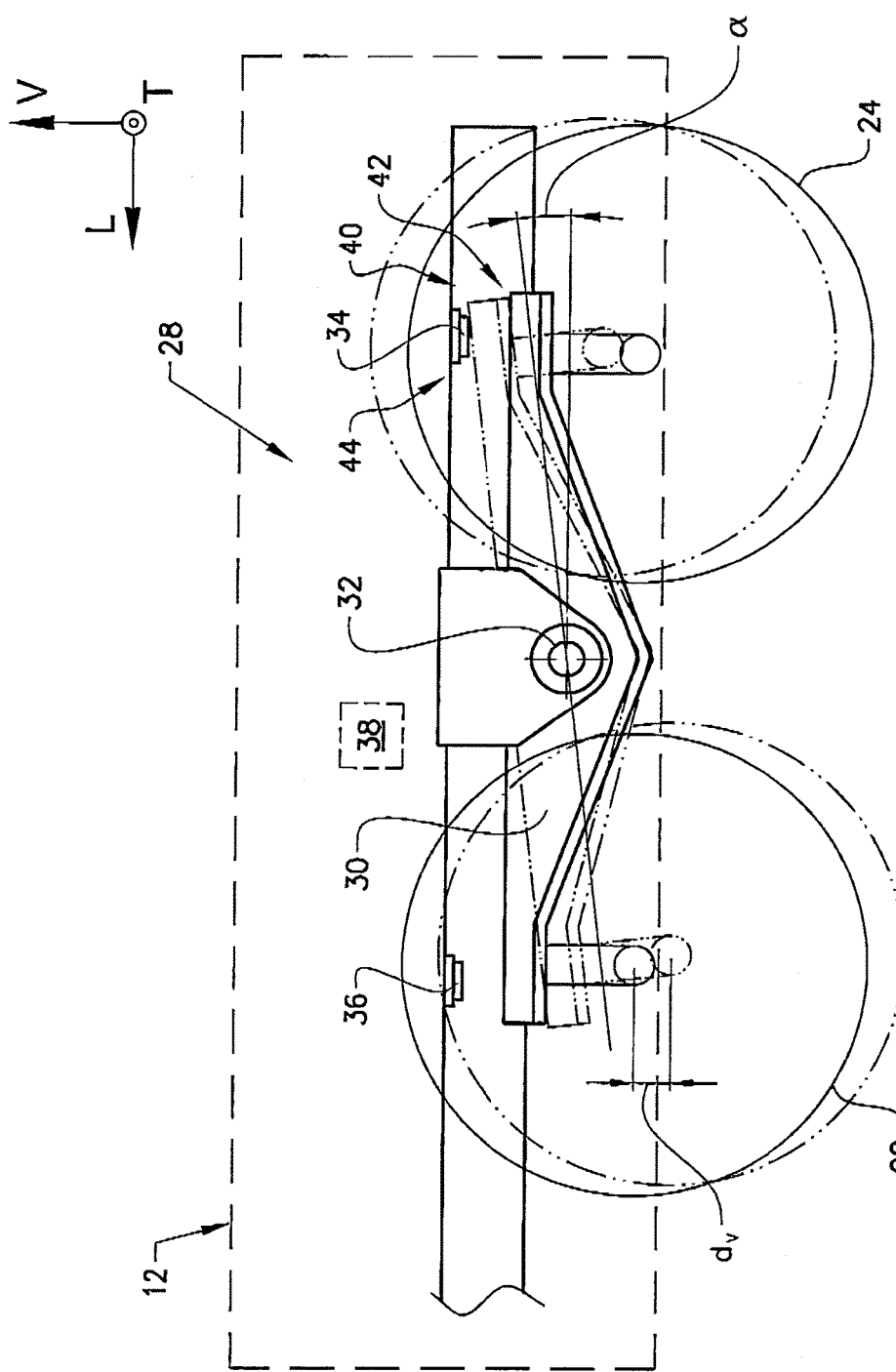
FIG. 2 is a schematic side view of a bogie system.

FIG. 2 illustrates the bogie system 28 of the FIG. 1 vehicle 0. The bogie system 28 comprises a plurality of wheels 22, 24. The FIG. 2 implementation of the bogie system 28 comprises two wheels 22, 24 that are located on the same side of the vehicle 10. As such, each one of the two wheels 22, 24 are located on the same side of a plane that extends along the longitudinal L and vertical V dimensions and which also coincides with the longitudinal centre line of the vehicle 10. However, other implementations of the bogie system 28 may comprise wheels that are located on separate sides of the above discussed plane.

Irrespective of the position of the wheels 22, 24 in relation of the vehicle 10, the bogie system 28 is generally such that each one of the wheels 22, 24 is allowed to be subjected to a relative vertical displacement in relation to the vehicle body 12. Generally, a positive relative vertical displacement is a relative vertical displacement in a vertical direction away from the vehicle body 12. Moreover, the bogie system 28 is generally such that a positive relative vertical displacement of one wheel 22 of the bogie system 28 results in a negative vertical displacement of another wheel 24 of the bogie system 28.

Moreover, FIG. 2 illustrates that the vehicle body 12 comprises a bogie beam stop 34 adapted to abut a portion of the bogie beam 30 to thereby obtain the relative vertical position limit. In fact, FIG. 2 illustrates that the vehicle body 12 comprises two bogie beam stops 34, 36, one on each side of the pivot point 32.

The vehicle 10 further generally comprises means for determining an actual relative vertical displacement of a wheel relative to the vehicle body 12. For an individual suspension arrangement 26, such a means may comprise a distance measuring arrangement (not shown), such as a sliding caliper (not shown) or the like, one end of which is connected to the vehicle body 12 and one end of which is connected to the wheel.

For a wheel of a bogie system 28, the actual relative vertical displacement of a wheel relative to the vehicle body 12 may also be determined by a distance measuring arrangement. However, the FIG. 2 implementation of the bogie system 28 comprises a pivot measuring arrangement 38 adapted to determine pivot angle a of the bogie beam 30 in relation to the vehicle body 12. Using the pivot angle a and the distance from the pivot point 32 to the wheel 22, 24, the actual relative vertical displacement $d_v$ of a wheel relative to the vehicle body 12 may be determined using trigonometry. As such, the pivot angle a may be used as a value indicative of the actual relative vertical displacement.

Further, the value of the pivot angle a of the bogie beam 30 in relation to the vehicle body 12 when the bogie beam 30 abuts either one of the bogie beam stops 34, 36 may be predetermined and stored in the control unit 34 for instance.

Instead of, or in addition to, the above discussed pivot measuring arrangement 38, a vehicle 10 may comprise a sensor 40, for instance an inductive sensor, wherein a first sensor portion 42 of the sensor 40 is connected to the bogie beam 30 and a second sensor portion 44 of the sensor 40 is connected to the stop 34. Using the above two sensor portions 42, 44, it is possible to determine the vertical distance between the bogie beam 30 and the stop 34.

Figure 3:
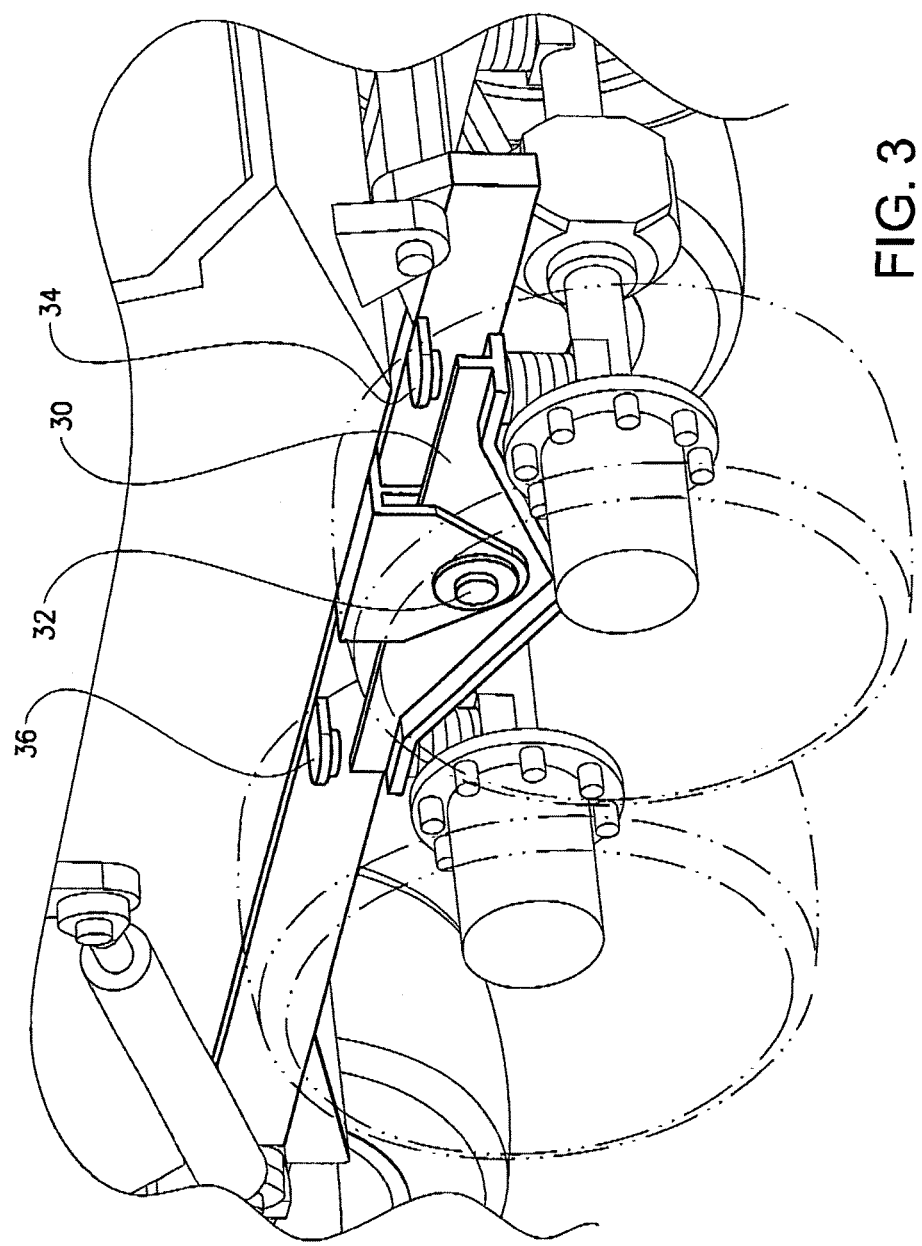
FIG. 3 is a schematic rear view in perspective of the FIG. 2 bogie system.

FIG. 3 is a rear view in perspective of a portion of the FIG. 2 vehicle 0 illustrating the bogie beam 30 and the stops 34, 36.

Figure 4:
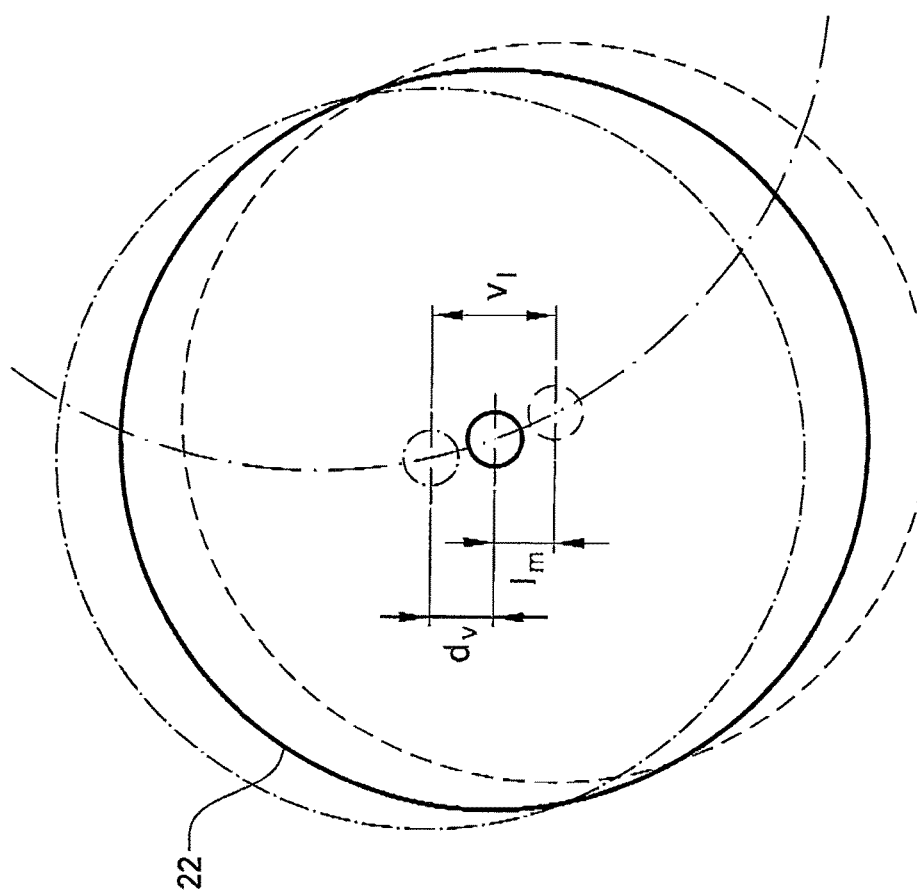
FIG. 4 is a schematic side view of a wheel in different vertical positions.

FIG. 4 illustrates a portion of the front wheel 22 of the FIG. 2 and FIG. 3 bogie system 28. In FIG. 4, the dashed an dotted line illustrates the wheel 22 in its original position, the dotted line illustrates the wheel 22 in its end position, i.e. when it has reached its relative vertical position limit $v_l$. Moreover, the solid line in FIG. 4 illustrates the wheel 22 in an actual position, i.e. when the wheel has been subjected to an actual relative vertical displacement $d_v$. A vertical direction away from the vehicle body, i.e. generally a vertical direction from the vehicle towards the ground, may be defined as a positive actual relative vertical displacement $d_v$.

When the wheel 22 is in the position indicated in FIG. 4, the wheel 22 is in a location with a limit margin $l_m$ which is the difference between the actual relative vertical displacement $d_v$ and the relative vertical position limit V].

It should be noted that the front wheel 22 bogie system 28 is only used as an example hereinabove for presenting the measures: actual relative vertical displacement $d_v$, relative vertical position limit ¼ and limit margin $l_m$ and that these measures may be determined for each one of the other wheels in a similar manner.

Figure 5:
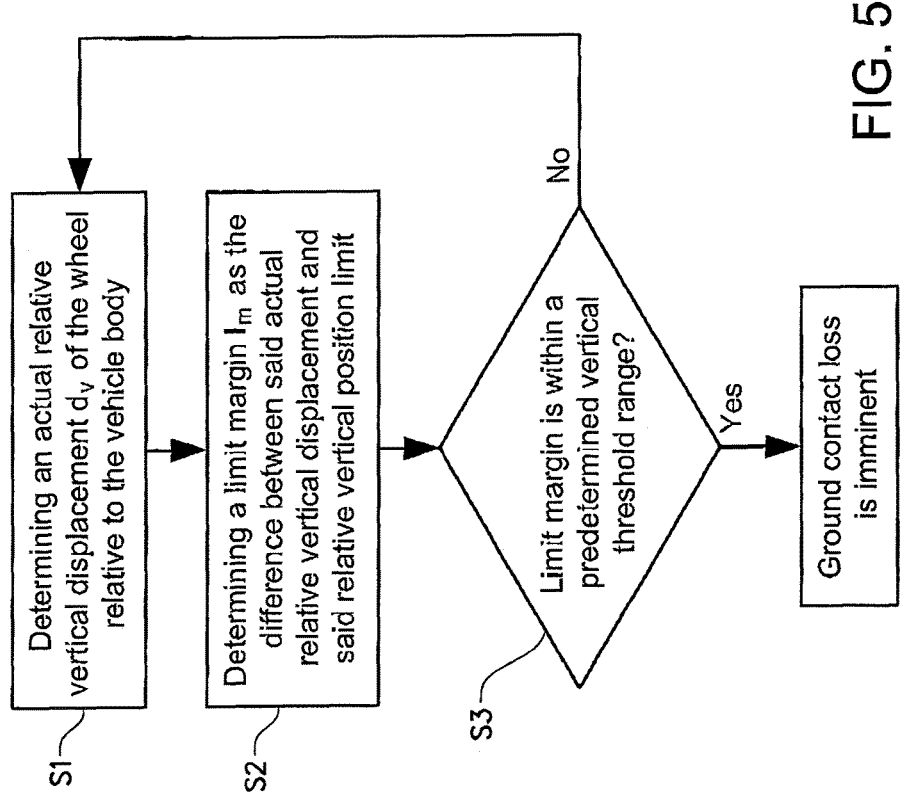
FIG. 5 is a flow chart illustrating an embodiment of the method for determining whether or not ground contact loss is imminent for a wheel of a vehicle.

As has been intimated above, an aspect of the present invention relates to a method for determining whether or not ground contact loss is imminent for a wheel 20, 22, 24 of a vehicle 10. The method may preferably be carried out by the control unit 34. A flow chart illustrating the method is presented in FIG. 5 and features of the method are presented hereinbelow.

A first step S1 of the method comprises determining an actual relative vertical displacement $d_v$ of the wheel 22, 24, 26 relative to the vehicle body 12. As has been advertised of hereinabove, the actual relative vertical displacement $d_v$ of the wheel 22, 24, 26 may be determined in a plurality of ways, such as a distance measuring arrangement, a pivot measuring arrangement and/or a sensor such as an inductive sensor. The measure actual relative vertical displacement $d_v$ is indicated for wheel 22 in FIG. 4. FIG. 4 also indicates the relative vertical position limit Vl for wheel 24.

A second step S2 of the method comprises determining a limit margin $l_m$ as the difference between the actual relative vertical displacement $d_v$, which has been determined in the first step S1, and the relative vertical position limit $v_l$.

A third step S3 of the method comprises determining that ground contact loss is imminent for a wheel if the limit margin is within a predetermined vertical threshold range $v_t$. Purely by way of example, the predetermined vertical threshold range $v_t$, may be defined as 90% to 100% of the relative vertical position limit Vl. Here, it should be noted that 0% indicates no vertical displacement and 100% indicates that the relative vertical position limit Vl has been reached.

It is also envisage that the predetermined vertical threshold range $v_l$ may be dependent on the configuration and/or operation of the vehicle 10. Purely by way of example, one possibility may be that the vertical threshold range $v_l$ may be relatively large for a vehicle 10 with six wheels that is in a condition wherein it is driven by four wheels (a so called 6×4 configuration). If it is determined that ground contact loss is imminent for one of the four wheels that are currently driving the vehicle 10 in a 6×4 configuration, two additional wheels may be operated to drive the vehicle 10 such that the vehicle assumes a so called 6×6 configuration. A reason for why the vertical threshold range $v_l$ may be relatively large for the above scenario is that the propulsion of the vehicle is generally not impaired when switching from a 6×4 configuration to a 6×6 configuration.

As another non-limiting example, the vertical threshold range $v_l$ may be relatively small for a vehicle 10 that is in a condition wherein it is driven by six wheels (a so called 6×6 configuration). If it is determined that ground contact loss is imminent for one of the six wheels that are currently driving the vehicle 10 in a 6×6 configuration, the propulsion of one or more wheels may have to be reduced or even removed and this may have a negative effect on e.g. the steering of the vehicle 10.

It is also envisaged that the value of the vertical threshold range $v_l$ may be dependent on at least one of the following parameters: the vehicle speed, the steering angle of the vehicle and the ground conditions. Instead of, or in addition to any one of the above parameters, the vertical threshold range $v_l$ may be dependent on the velocity and/or acceleration of the actual relative vertical displacement $d_v$ of the wheel 22, 24.

In the event that the above method is implemented for a wheel that forms part of a bogie system 28, the method may comprise determining which one of the wheels 22, 24 of the bogie system 28 that has the largest positive relative vertical displacement.

The information that ground contact loss is imminent for a wheel may be used in a plurality of ways. Purely by way of example, the control unit 34 may be adapted to issue a signal that indicates that ground contact loss is imminent and optionally also for which wheel ground contact loss is imminent. As a non-limiting example, such a signal may be received by a driver information unit (not shown) which for instance may sound an alarm or present the information on a display (not shown).

Figure 6:
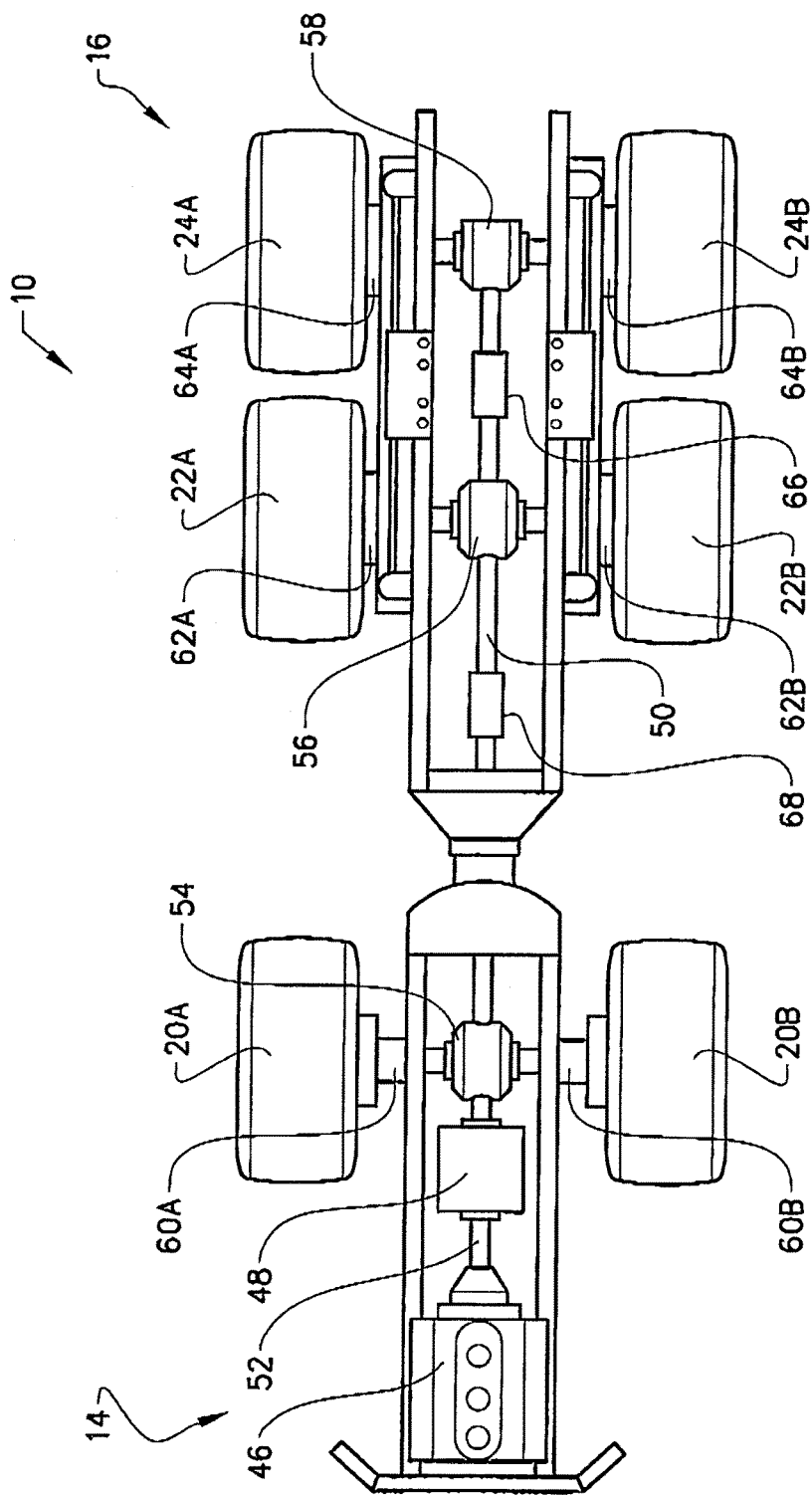
FIG. 6 is a schematic top view of the FIG. 1 vehicle.

FIG. 6 illustrates a top view of the FIG. 1 vehicle 10. As may be gleaned from FIG. 6, the vehicle 10 comprises a plurality of wheels 20A, 20B, 22A, 22B, 24A, 24B that are connected to a power source 46, e.g. an internal combustion engine and/or an electric motor, via a transmission assembly 48, drive shafts 50, 52 and a plurality of differentials 54, 56, 58, 66, viz three transversal differentials 54, 56, 58 connecting a drive shaft 50, 52 to wheel axles, a rear longitudinal differential 66 connecting two portions of a drive shaft 50 and a central longitudinal differential 68 connecting the drive shafts 50, 52.

The vehicle further comprises a plurality of brakes 60A, 60B, 62A, 62B, 64A, 64B for braking each one of the wheels 20A, 20B, 22A, 22B, 24A, 24B. However, it should be noted that other embodiments of the vehicle 10 may comprise one or more brakes (not shown) that is adapted to brake one or more wheels 20A, 20B, 22A, 22B, 24A, 24B.

The information whether or not ground contact loss is imminent for a wheel 20, 22, 24 of a vehicle 0 may be used in a method for controlling the operation of at least that wheel 20, 22, 24 vehicle 10. Based on whether or not it is determined that ground contact loss is imminent for a wheel, the operation of the wheel may be modified. For instance, the level of the torque that is transmitted to a wheel for which ground contact loss is imminent, e.g. a brake torque or a propulsion torque, may have to be adjusted, generally reduced.

As such, a method for controlling the operation of a wheel of a vehicle may comprise the features that are presented hereinbelow.

The wheel operation control method may comprise determining whether or not ground contact loss is imminent for the wheel using the above discussed method. In the event that it is determined that ground contact loss is imminent the torque that is transmitted to the wheel is reduced.

For instance, if a brake force is applied to one of the wheels 20A, 20B, 22A, 22B, 24A, 24B of the FIG. 6 vehicle 10, which brake force results in a brake torque, and it is determined that ground contact loss is imminent for that wheel, the brake torque may be reduced for that wheel. Optionally, the brake torque may instead be increased for one or more of the wheels for which ground contact loss is not imminent in order to obtain an appropriate total brake force for the vehicle 0. The above transfer of brake torque may be achieved by actuating one or more of the brakes 60A, 60B, 62A, 62B, 64A, 64B that have been discussed hereinabove with reference to FIG. 6, In a similar vein, if a driving torque is applied to one of the wheels 20A, 20B, 22A, 22B, 24A, 24B of the FIG. 6 vehicle 10, and it is determined that ground contact loss is imminent for that wheel, the driving torque may be reduced for that wheel. Optionally, the driving torque may instead be increased for one or more of the wheels for which ground contact loss is not imminent in order to obtain an appropriate propulsion of the vehicle 10.

The above transfer of brake torque may be achieved by actuating one or more, of the differentials 54, 56, 58, 66, 68 that have been discussed hereinabove with reference to FIG. 6.

Purely by way of example, at least one of the differentials 54, 56, 58, 66, 68 may comprise a differential arrangement (not shown) for selectively disengaging or locking, respectively, the differential 54, 56, 58, 66, 68. As a non-limiting example, the differential arrangement may be adapted to assume a disengaging condition or a locking condition, respectively, in an on-off manner. In such an implementation of the differential arrangement, the differential arrangement may preferably comprise a lock (not shown). Optionally, the differential arrangement may be adapted to assume a disengaging condition or a locking condition, respectively, in a step-wise and/or continuous manner. In such an implementation of the differential arrangement, the differential arrangement may preferably comprise a clutch (not shown). It is also envisaged that an implementation of a differential arrangement may comprise a lock as well as a clutch.

The differential arrangement of a transversal differential may for instance be adapted to assume a disengaging condition or locking condition, respectively, individually for each one of the wheels that is associated with the transversal differential 54, 56, 58. Optionally, the differential arrangement may be adapted to assume a disengaging condition or locking condition, respectively, for all the wheels that are associated with the transversal differential 54, 56, 58.

If a driving torque is applied to one of the wheels 20A, 20B, 22A, 22B, 24A, 24B of a vehicle 10 comprising differentials 54, 56, 58, 66, 68 as have been discussed hereinabove, and it is determined that ground contact loss is imminent for that wheel, the driving torque may be reduced for that wheel, or for all the wheels that are connected to the same differential, by disengaging, fully or partially, the differential 54, 56, 58, 66, 68 associated with that wheel. Moreover, the differential for another wheel, or another set of wheels, may be operated so as to increase the torque distribution from the associated drive shaft to those wheels.

The above procedure will be exemplified hereinbelow in a situation in which it is determined that ground contact loss is imminent for the rearmost wheels 24A, 24B of the FIG. 6 vehicle 10. The rear transversal differential 58 may then be operated to disengage, partially or fully, the rearmost wheels 24A, 24B from the rear drive shaft 50 in order to reduce or cancel the torque distribution from the rear drive shaft 50 to the rearmost wheels 24A, 24B. Moreover, the transversal differential 56 associated with the front wheels 22A, 22B of the rear vehicle portion may be operated to lock, partially or fully, the front wheels 22A, 22B of the rear vehicle portion 16 to the rear drive shaft 50 in order to increase the torque distribution from the rear drive shaft 50 to the front wheels 22A, 22B of the rear vehicle portion 16.

By using the above procedure, the risk that the rearmost wheels 24A, 24B will slip may be reduced due to the reduced or cancelled torque distribution to the rearmost wheels 24A, 24B. Moreover, by virtue of the fact that the torque distribution to the front wheels 22A, 22B of the rear vehicle portion 16 is increased, an appropriate propulsion of the vehicle 10 is nevertheless obtained.

Instead of, or in addition to, using the transversal differentials 54, 56, 58 for redistributing the torque between the wheels, the torque redistribution may be achieved by using the rear longitudinal differential 66. As such, in the above-discussed scenario wherein it is determined that ground contact loss is imminent for the rearmost wheels 24A, 24B of the FIG. 6 vehicle 10, the rear longitudinal differential 66 may be operated so as to disengage, partially or fully, the rearmost portion of the drive shaft 50 from the foremost portion of the drive shaft 50 to thereby reduce the amount of torque that is distributed to the rearmost wheels 24A, 24B. To this end, though purely by way of example, the rear longitudinal differential] 66 may comprise a clutch, such as a dog clutch. At the same time, the central longitudinal differential 68 may be operated so as to increase the torque distribution to the aft drive shaft 50 to thereby increase the torque distributed to the front wheels 22A, 22B of the rear vehicle portion 16.

It is to be understood that the present invention is not limited to the embodiments described above and illustrated in the drawings; rather, the skilled person will recognize that many changes and modifications may be made within the scope of the appended claims.

The invention claimed is:

1. A method for determining whether or not ground contact loss is imminent for a wheel of a vehicle, the vehicle comprising a vehicle body having a vertical extension in a vertical direction, the wheel being allowed to be subjected to a relative vertical displacement, in the vertical direction, in relation to the vehicle body, wherein the vehicle further is such that a maximum value of a vertical displacement of the wheel relative to the vehicle body is limited to a relative vertical displacement limit, the method comprising:
   determining an actual relative vertical displacement of the wheel relative to the vehicle body,
   determining a limit margin as the difference between the actual relative vertical displacement and the relative vertical position limit,
   determining that ground contact loss is imminent for the wheel if the limit margin is within a predetermined vertical threshold range, and
   upon determining that ground contact loss is imminent, reducing torque that is transmitted to the wheel,
   wherein the vehicle comprises a bogie system, the bogie system comprising a plurality of wheels and the bogie system being such that each one of the wheels is allowed to be subjected to a relative vertical displacement in relation to the vehicle body.

2. The method according to claim 1, wherein a positive relative vertical displacement is a relative vertical displacement in a vertical direction away from the vehicle body, the method further comprising:
   determining which one of the wheels of the bogie system that has the largest positive relative vertical displacement.

3. The method according to claim 2, wherein the bogie system is such that a positive relative vertical displacement of one wheel of the bogie system results in a negative vertical displacement of another wheel of the bogie system.

4. The method according to claim 1, wherein the bogie system comprises a bogie beam connecting the wheels, the bogie beam being pivotable in relation to the vehicle body, the method comprising determining a pivot angle of the bogie beam in relation to the vehicle body and using the pivot angle as a value indicative of the actual relative vertical displacement.

5. The method according to claim 4, wherein the method comprises determining the pivot angle by using a pivot measuring arrangement adapted to measure the pivot angle of the bogie beam in relation to the vehicle body.

6. The method according to claim 4, wherein the vehicle body comprises bogie beam stop adapted to abut a portion of the bogie beam to thereby obtain the relative vertical position limit.

7. The method according to claim 6, wherein the method comprises determining the pivot angle using a sensor, wherein a first sensor portion of the sensor is connected to the bogie beam and a second sensor portion of the sensor is connected to the stop.

8. The method according to claim 1, wherein at least two wheels of the bogie system are located on the same side of the vehicle.

9. The method according to claim 1, wherein the method further comprises:
   increasing torque that is transmitted to another wheel of the vehicle.

10. A computer comprising a computer program for performing the steps of claim 1 when the program is run on the computer.

11. A non-transitory computer readable medium carrying a computer program for performing the steps of claim 1 when the program product is run on a computer.

12. A control unit for a vehicle, the control unit being adapted to determine whether or not ground contact loss is imminent for a wheel of the vehicle, the vehicle comprising a vehicle body having a vertical extension in a vertical direction, the wheel being allowed to be subjected to a relative vertical displacement, in the vertical direction, in relation to the vehicle body, wherein the vehicle further is such that a maximum value of a vertical displacement of the wheel relative to the vehicle body is limited to a relative vertical displacement limit, the control unit being adapted to:
   determine an actual relative vertical displacement of the wheel relative to the vehicle body,
   determine a limit margin as the difference between the actual relative vertical displacement and the relative vertical position limit,
   determine that ground contact loss is imminent for a wheel if the limit margin is within a predetermined vertical threshold range,
   upon determining that ground contact loss is imminent, reduce torque that is transmitted to the wheel,
   wherein the vehicle comprises a bogie system, the bogie system comprising a plurality of wheels and the bogie system being such that each one of the wheels is allowed to be subjected to a relative vertical displacement in relation to the vehicle body.

13. The control unit according to claim 12, wherein a positive relative vertical displacement is a relative vertical displacement in a vertical direction away from the vehicle body, the control unit further being adapted to:
   determine which one of the wheels of the bogie system that has the largest positive relative vertical displacement.

14. The control unit according to claim 13, wherein the bogie system is such that a positive relative vertical displacement of one wheel of the bogie system results in a negative vertical displacement of another wheel of the bogie system.

15. The control unit according to claim 12, wherein the bogie system comprises a bogie beam connecting the wheels, the bogie beam being pivotable in relation to the vehicle body, the control unit further being adapted to determine a pivot angle of the bogie beam in relation to the vehicle body and using the pivot angle as a value indicative of the actual relative vertical displacement.

16. The control unit according to claim 15, wherein the control unit is adapted to determine the pivot angle by using an pivot measuring arrangement adapted to measure the pivot angle of the bogie beam in relation to the vehicle body.

17. The control unit according to claim 16, wherein the vehicle body comprises a bogie beam stop adapted to abut a portion of the bogie beam to thereby obtain the relative vertical position limit.

18. The control unit according to claim 17, wherein the control unit is adapted to determine the pivot angle using a sensor, wherein a first sensor portion of the sensor is connected to the bogie beam and a second sensor portion of the sensor is connected to the stop.

19. The control unit according to claim 12, wherein the control unit is adapted to:
   increase the torque that is transmitted to another wheel of the bogie system.

20. The control unit according to claim 12, wherein at least two wheels of the bogie system are located on the same side of the vehicle.

21. A vehicle comprising a control unit according to claim 12.

* * * * *